(12) United States Patent
Widdowson et al.

(10) Patent No.: US 7,602,087 B2
(45) Date of Patent: Oct. 13, 2009

(54) LINEAR MOTOR HAVING DUAL COIL CONFIGURATION

(75) Inventors: Gary Peter Widdowson, Hong Kong (HK); Dazhang Liao, Hong Kong (HK)

(73) Assignee: ASM Assembly Automation Ltd., Hong Kong (HK)

( * ) Notice: Subject to any disclaimer, the term of this patent is extended or adjusted under 35 U.S.C. 154(b) by 245 days.

(21) Appl. No.: 11/550,866

(22) Filed: Oct. 19, 2006

(65) Prior Publication Data
US 2008/0093936 A1 Apr. 24, 2008

(51) Int. Cl.
*H02K 41/00* (2006.01)
(52) U.S. Cl. ....................................................... 310/12
(58) Field of Classification Search .................. 310/12, 310/179
See application file for complete search history.

(56) References Cited

U.S. PATENT DOCUMENTS

| 4,749,921 | A | 6/1988 | Chitayat | 318/135 |
|---|---|---|---|---|
| 6,864,601 | B2* | 3/2005 | Sogard | 310/12 |
| 7,148,590 | B1* | 12/2006 | Lampson | 310/12 |
| 7,161,267 | B2* | 1/2007 | Hol et al. | 310/12 |
| 2004/0032169 | A1* | 2/2004 | Widdowson et al. | 310/12 |
| 2006/0049699 | A1* | 3/2006 | Wang et al. | 310/12 |

* cited by examiner

*Primary Examiner*—Nguyen N Hanh
(74) *Attorney, Agent, or Firm*—Ostrolenk Faber LLp

(57) ABSTRACT

A linear motor is provided that includes a magnetic assembly, a movable element and a coil assembly that is operative to interact with the magnetic assembly to drive the movable element along a direction. The coil assembly further includes a first coil section having a first motor force constant and a second coil section having a second motor force constant that is lower than that of the first coil section for driving the movable element along the said direction.

11 Claims, 3 Drawing Sheets

LINEAR MOTOR HAVING DUAL COIL CONFIGURATION

FIELD OF THE INVENTION

The invention relates to a linear motor for driving an object along an axis, and in particular to a linear motor wherein a plurality of coils and permanent magnets are arranged for driving the object.

BACKGROUND AND PRIOR ART

There are many applications in positioning systems which utilize linear motors. These linear motors produce linear forces in response to an electrical current input and are desirable for providing linear forces accurately with high-precision and fast response times.

For example, U.S. Pat. No. 4,749,921 entitled "Linear Motor with Non-Magnetic Armature" discloses a design for a linear motor that incorporates an armature assembly having a plurality of coil windings in a three-phase linear motor system comprising three coil sets. The coil sets cooperate with a plurality of permanent magnets to produce forces in a linear direction through electromagnetic interaction when current is supplied through the coils. Such linear motors are capable of producing specific rated forces depending upon the current applied to them. In order to produce different driving forces, the amount of current supplied to the coils must be varied accordingly.

FIG. 1 is an isometric view of a gantry system 10 that is operable to position an object 12 along an X-Y plane. The gantry system 10 generally comprises a base support 14 which includes vertical sidewalls, a gantry beam 16 having separate sections 18a, 18b and supported at its respective ends by each vertical sidewall, a linear guide rail 20 for guiding movement of one section 18a of the gantry beam 16 along one vertical sidewall, and a bearing such as an air bearing 22 for supporting a second section 18b of the gantry beam 16 along the other vertical sidewall.

There is a pair of linear motors 24, 24' each driving a respective end of the first section 18a and the second section 18b substantially synchronously in parallel directions to position the gantry beam 16 along a linear axis (ie. the Y axis in FIG. 1). Each linear motor 24, 24' comprises a magnetic assembly including rows of magnets cooperating with a coil bracket including coil windings which is movable relative to the magnetic assembly. The magnet assemblies may be mounted to the base support 14 whereas the coil brackets may be mounted to the gantry beam 16.

The object 12 is slidably mounted on the gantry beam 16 and is movable along an axis parallel to the length of the gantry beam 16 (ie. the X axis in FIG. 1). The object is preferably drivable by another linear motor. For convenience, the axis along which the object 12 is slidably movable is referred to as the X axis and the axis along which the guiding rail 20 guides the gantry beam 16 is referred to as the Y axis. It would be appreciated that a combination of movement of the object 12 in the X and Y axes driven by the respective linear motors serve to move the object 12 to various locations on an X-Y plane.

Flexibility in the gantry beam 16 is introduced by incorporating a flexure 26 which separates the two sections of the gantry beam 14. The flexure 26 allows the second section 18b to be deflectable relative to the first section 18a of the gantry beam 16 about the flexure 26.

During operation, it is preferable that the two ends of the gantry beam 16 are driven simultaneously by the same distance so that the beam is maintained parallel to the X axis. However, if there is asynchrony between the linear motors 24, 24', an end driven by one linear motor may be driven further than another end driven by the other linear motor.

With the flexure 26 incorporated into the gantry beam 16, one section of the beam 16 is allowed to deflect and rotate due to the limited degree of movement of an end of the gantry beam 16 supported on the air bearing. The other section of the gantry beam 16 remains relatively fixed. Thus, the stresses on the system 10 can be reduced, and the rotational resonant frequency is reduced to a value that is no longer difficult to control.

Since the system 10 encompasses a flexure 26 that allows one axis of the gantry 16 to rotate, it is necessary to provide a compensatory or correction force to maintain the parallelism of the gantry beam 16 in the X axis. Thus, the two linear motors 24, 24' should be operable for both linear motion in the Y axis and for relative motion in the Y direction to reposition the gantry beam 16 about the Z axis. However, depending upon the payload of the system 10, it is likely that the control gains of the two linear motors 24, 24' will not be identical, and will, perhaps greatly differ. With these two control axes (linear and rotational) having large gain variations and yet being controlled by the same linear motor, this is likely to lead to a significant control mismatch and noise, reducing the performance of the gantry system 10.

It would be desirable to be able to drive the gantry beam 16 along a control axis with a higher inertia with a linear motor with a larger motor force constant, and along a control axis with a lower inertia with a linear motor with a lower motor force constant. It would also be desirable for both of these linear motors to be designed in a structure that is compact.

SUMMARY OF THE INVENTION

It is thus an object of the invention to seek to provide a compact structure including a linear motor that has a high force constant motor and a linear motor that has a low force constant motor so as to avoid at least some of the aforesaid disadvantages of prior art driving apparatus.

Accordingly, the invention provides a linear motor comprising: a magnetic assembly; a movable element; a coil assembly that is operative to interact with the magnetic assembly to drive the movable element along a direction; wherein the coil assembly comprises a first coil section having a first motor force constant and a second coil section having a second motor force constant that is lower than that of the first coil section for driving the movable element along the said direction.

It would be convenient hereinafter to describe the invention in greater detail by reference to the accompanying drawings which illustrates a preferred embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of the dual coil motor system in accordance with the invention will now be described with reference to the accompanying drawings, in which.

DETAILED DESCRIPTION OF THE PREFERRED EMBODIMENTS OF THE INVENTION

Figure 1:
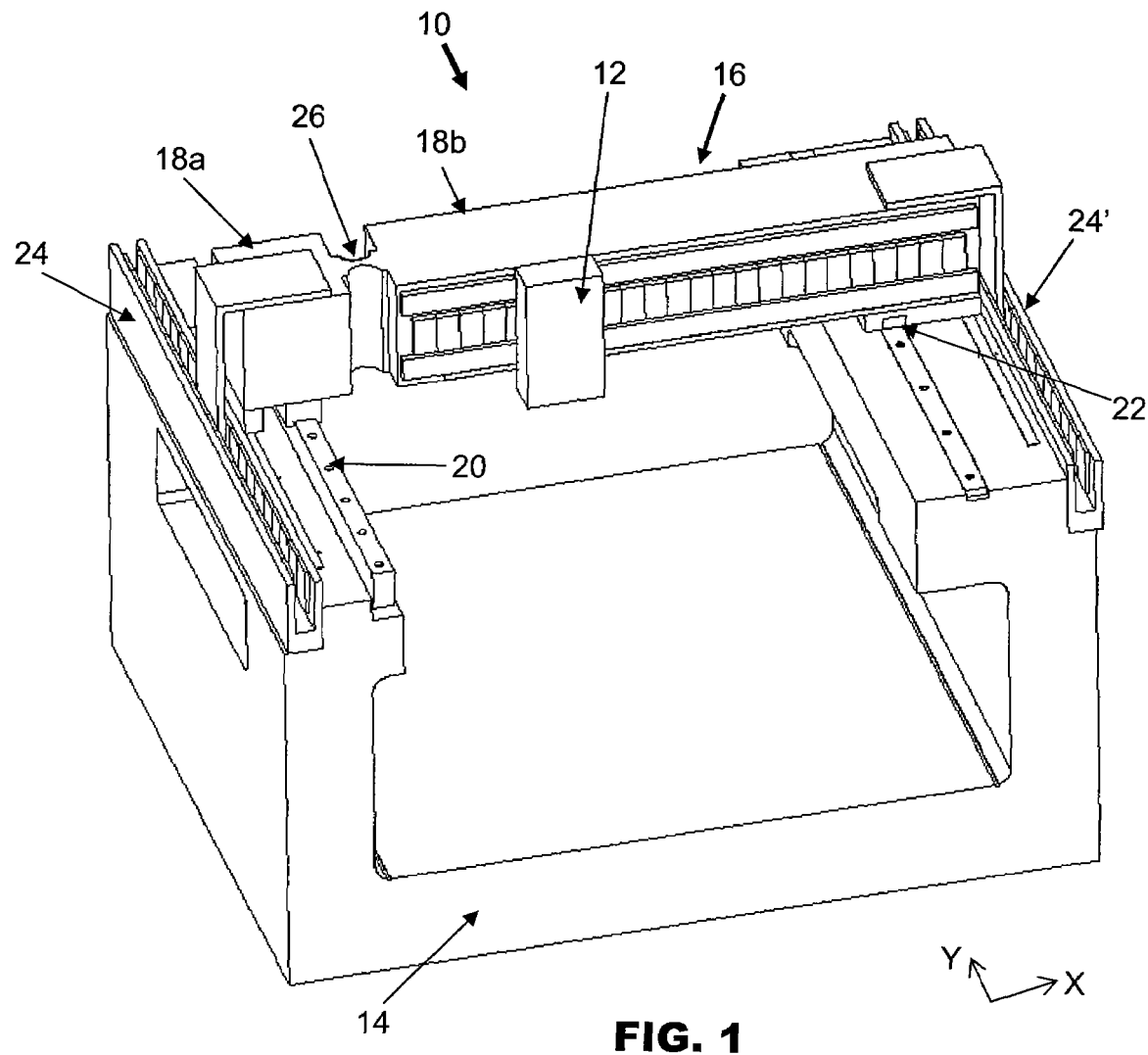
FIG. 1 is an isometric view of a gantry system that is operable to position an object along an X-Y plane.
Figure 2:
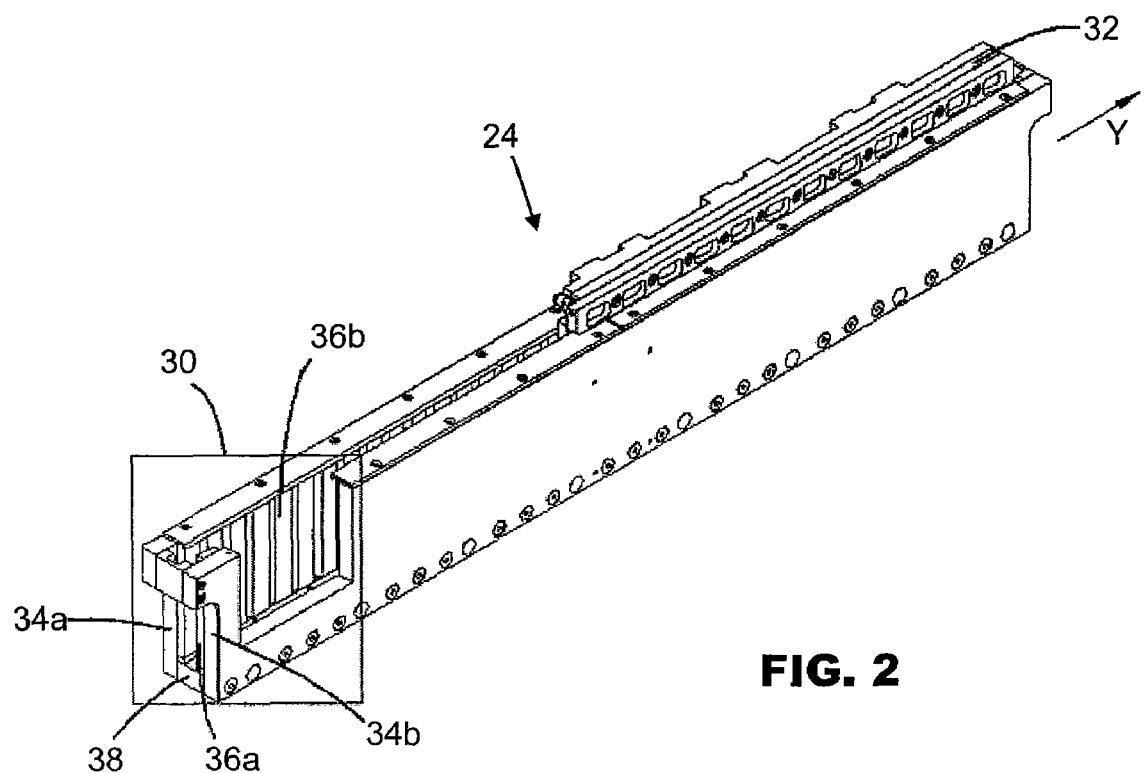
FIG. 2 is an isometric view of a linear motor that may be comprised in the gantry system of FIG. 1.

FIG. 2 is an isometric view of a linear motor 24 that may be incorporated in at least one of the linear motors 24, 24' of the gantry system 10 of FIG. 1. The linear motor 24 comprises a magnetic assembly 30 that is preferably stationary, and a movable element, which may be in the form of a coil bracket assembly 32, in which current-carrying coils are mounted onto the movable element. The coils are operative to interact with the magnetic assembly 30 to drive the coil bracket assembly 32 in a direction Y.

In the preferred embodiment, the linear motor is a multi-phase linear motor in which its current-carrying coils are selectively switched over in accordance with the position of the movable coil bracket assembly 32 of the linear motor. This type of linear motor 24 is typically used when long displacement is required, a gantry application being one such example. The magnetic assembly 30 is comprised of portions of high permeability soft iron 34a, 34b and a series of high strength permanent magnets 36a, 36b. The portions of high permeability soft iron 34a, 34b and permanent magnets 36a, 36b are separated by a spacer 38. The spacer 38 can be either a non-magnetic material, such as Aluminum or Stainless steel, or a high permeability soft iron. The spacer 38 is designed such that the coil bracket 32 can be positioned to move freely within the space created between the rows of permanent magnets 36a and 36b.

Figure 3:
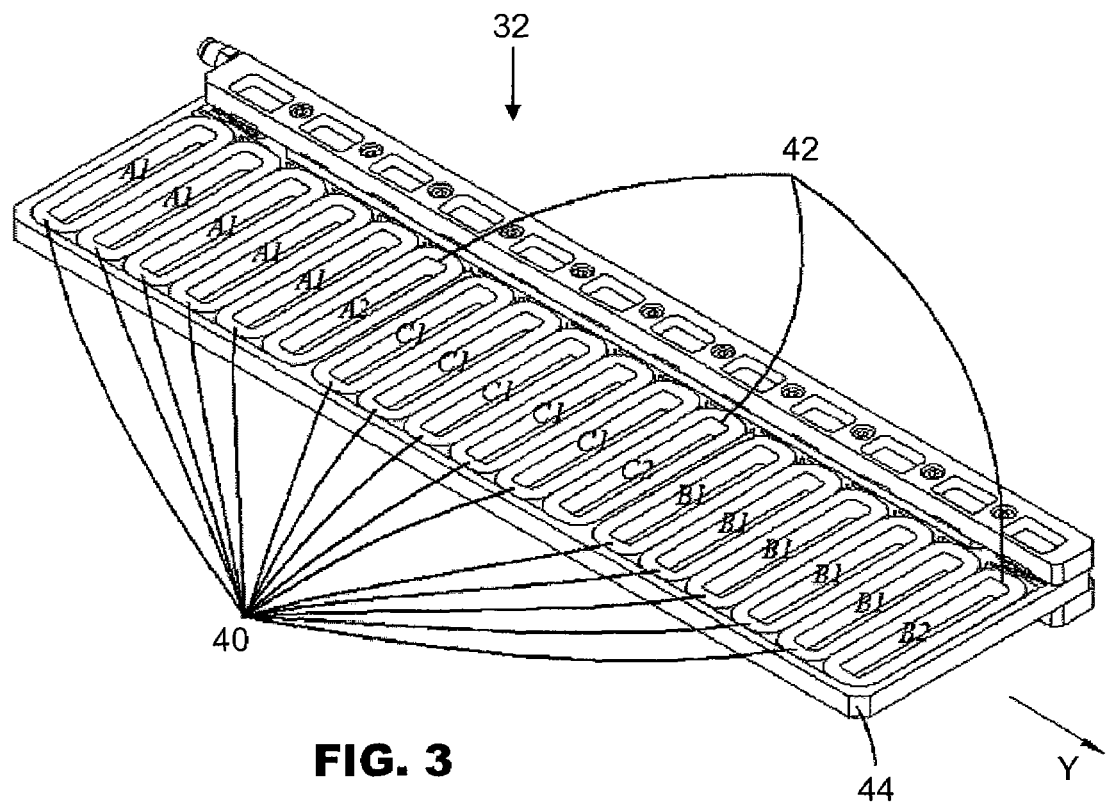
FIG. 3 is an isometric view of a coil bracket of the linear motor comprising multi-phase coils arranged according to the first preferred embodiment of the invention.

FIG. 3 is an isometric view of a coil bracket 32 of the linear motor 24 comprising multi-phase coils 40, 42 arranged according to the first preferred embodiment of the invention. It comprises a non-magnetic carrier 44, which is usually made of a low electrical conductivity material such as a fiber reinforced plastic. However, it can also be made from a conductive material such as stainless steel or Aluminum, although this may cause reactionary forces to motion created by eddy currents. The coil bracket assembly 32 further comprises a first coil section 40 and a second coil section 42 wherein the respective coils of the different sections are juxtaposed alongside one another along the same plane. The correct interaction of currents passing through the coil sections 40, 42 with the stationary field assembly 30 will generate a force that is exerted on the coil bracket assembly 32 in the Y direction. The number of coils in the first coil section 40 is a product of the number of electrical phases incorporated in the design and the number of coils per phase required to provide the necessary force. For example, if five coils are required per phase to provide the necessary force and the linear motor 24 has a three-phase topology, then fifteen coils would be used in the first coil section 40.

The first coil section 40 and the magnetic assembly 30 are sufficient for the production of a driving force in the linear motor 24. However, in an application such as the gantry system 10 illustrated in FIG. 1, there exists more than one degree of motion for the mechanical system. As described above, the gantry system 10 is capable of both linear translation and rotational motion (both produced by the linear motors 24). For optimal control, it would be preferable if the ratio of a moving mass/motor force constant in the linear axis is the same as the moving inertia/torque constant in the rotational axis.

Nevertheless, it is often not possible to obtain such similar moving mass/motor force constant and moving inertia/torque constant ratios mechanically. Hence, the second coil section 42, which has a different motor force constant (or torque constant, when utilized in the rotational axis) as compared to that of the first coil section 40, is mounted next to the first coil section 40 in the same coil bracket assembly 32. Preferably, the second coil section 42 has a lower motor force constant than the first coil section 40. Both coil sections 40, 42 are mounted onto the same coil bracket assembly 32. Thus, the first coil section 40 is operative to substantially drive linear motion of the gantry beam 16 and the second coil section 42 is operative to substantially drive rotary motion of the gantry beam 16.

In the first preferred embodiment shown in FIG. 3, the second coil section 42 has one coil per phase and a total of three phases in the linear motor 24. Hence, there are a total of three coils A2, B2, C2 in the second coil section 42 for driving rotational motion of the gantry beam 16. However, it should be appreciated that it would be feasible to employ any other multi-phase arrangement and any plurality of coils per phase, such that the number of phases in the first coil section is different from the number of phases in the second coil section.

The numbers of individual coil turns in each coil winding of the first and second coil sections 40, 42 are preferably calculated to achieve a similar ratio of moving mass/ force constant and moving inertia/torque constant. The designs of the separate coil sections 40, 42 are also configured to optimize their performance for the same magnetic assembly 30. The coil sections 40, 42 are each energized by a separate power amplifier and are thus independent. During operation of the gantry system driven by the dual coil motors for the application represented in FIG. 1, both coil sections 40, 42 should be operated simultaneously but from two power amplifiers.

Figure 4:
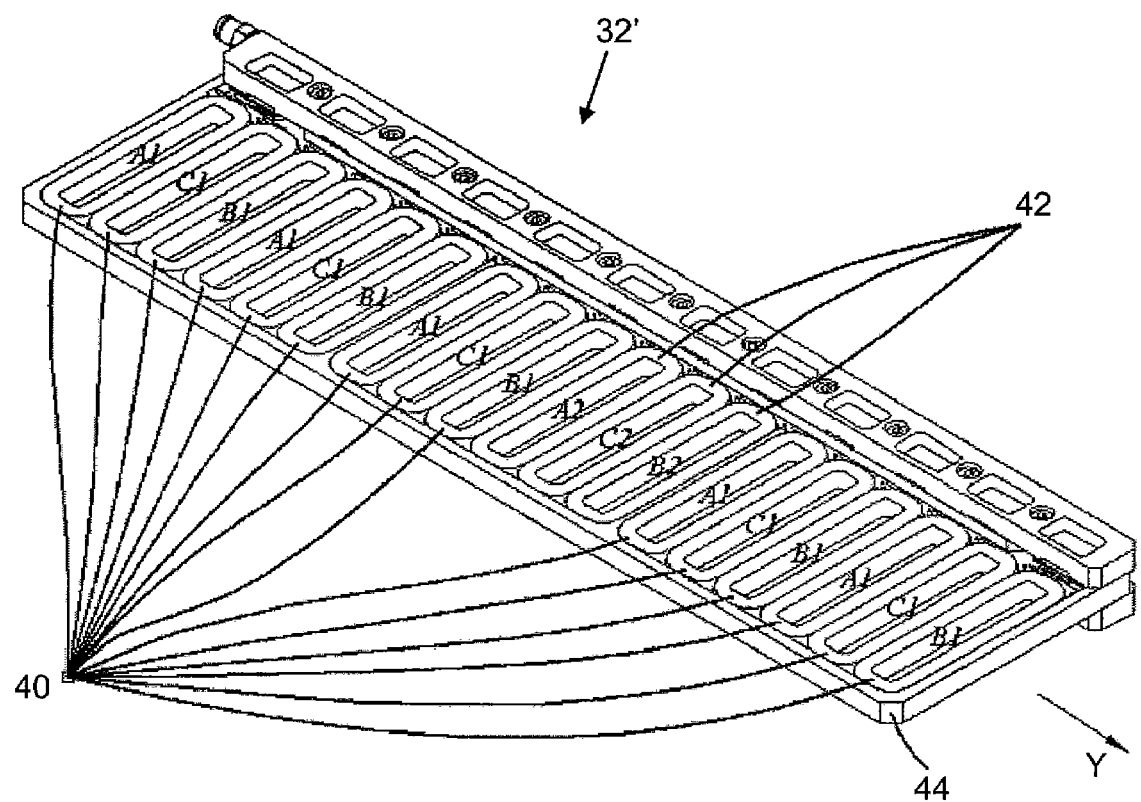
FIG. 4 is an isometric view of a coil bracket of the linear motor comprising multi-phase coils arranged according to the second preferred embodiment of the invention.

FIG. 4 is an isometric view of a coil bracket 32' of the linear motor 24 comprising multi-phase coils arranged according to the second preferred embodiment of the invention. In this preferred embodiment, the coils of the second coil section 42 are positioned consecutively next to each other, in between the coils of the first coil section 40.

The preferred embodiments of the invention therefore disclose a moving coil arrangement in a linear motor that comprises two groups of coils arranged in one coil bracket, such that when connected to two separate power amplifiers, there are in effect two motors with different force constants. It would be appreciated that, in this way, the described linear motor systems allow for improved motion performance, particularly in the reduction of noise and vibration for systems where it is proposed to use the same motors to control two degrees of freedom in a positioning system.

The invention described herein is susceptible to variations, modifications and/or additions other than those specifically described and it is to be understood that the invention includes all such variations, modifications and/or additions which fall within the spirit and scope of the above description.

The invention claimed is:
1. A linear motor comprising:
   a magnetic assembly;
   a coil bracket;
   a coil assembly mounted onto the coil bracket, the coil assembly being operative to interact with the magnetic assembly to drive the coil bracket along a direction;
   wherein the coil assembly comprises a first coil section having a first motor force constant and a second coil section having a second motor force constant that is lower than the first motor force constant of the first coil section, the first and second coil sections being positioned within the coil bracket and configured to drive the coil bracket along the direction.

2. The linear motor as claimed in claim 1, wherein the first and second coil sections each comprises a plurality of multiphase coils.

3. The linear motor as claimed in claim 2, wherein a number of phases in the first coil section is the same as a number of phases in the second coil section.

4. The linear motor as claimed in claim 2, wherein a number of coils per phase is different for each of the first and second coil sections.

5. The linear motor as claimed in claim 2, wherein there is an equal number of coils per phase in the first coil section.

6. The linear motor as claimed in claim 1, wherein coils of the first coil section are juxtaposed alongside coils of the second coil section substantially along the same plane.

7. The linear motor as claimed in claim 6, wherein the coils of the second coil section are distributed consecutively between the coils of the first coil section.

8. A gantry system having first and second linear motors for driving a gantry beam along a direction, at least one of the linear motors comprising:
   a magnetic assembly;
   a coil bracket; and
   a coil assembly mounted onto the coil bracket, the coil assembly being operative to interact with the magnetic assembly to drive the coil bracket along the direction, the coil assembly comprising a first coil section having a first motor force constant, the coil assembly further comprising a second coil section having a second motor force constant that is lower than the first motor force constant of the first coil section, the first and second coil sections being positioned within the coil bracket and configured to drive the coil bracket along the direction.

9. The gantry system as claimed in claim 8, wherein the second linear motor is configured to cooperate with the first linear motor to drive the gantry beam in a linear direction, and the second linear motor is also configured for relative motion with respect to the first linear motor in the linear direction so as to rotate the gantry beam.

10. The gantry system as claimed in claim 8, wherein the first coil section of the at least one linear motor is operative to substantially drive linear motion of the gantry beam and the second coil section of the at least one linear motor is operative to substantially drive rotary motion of the gantry beam.

11. The gantry system as claimed in claim 10, wherein the at least one linear motor is constructed to achieve a ratio of moving mass/motor force constant in a linear axis that is similar to a ratio of moving inertia/torque constant in a rotational axis.

* * * * *